(No Model.)
J. ERNY, Z. T. SUBERS & W. HOOS.
FREEZING APPARATUS.
No. 446,252.  Patented Feb. 10, 1891.
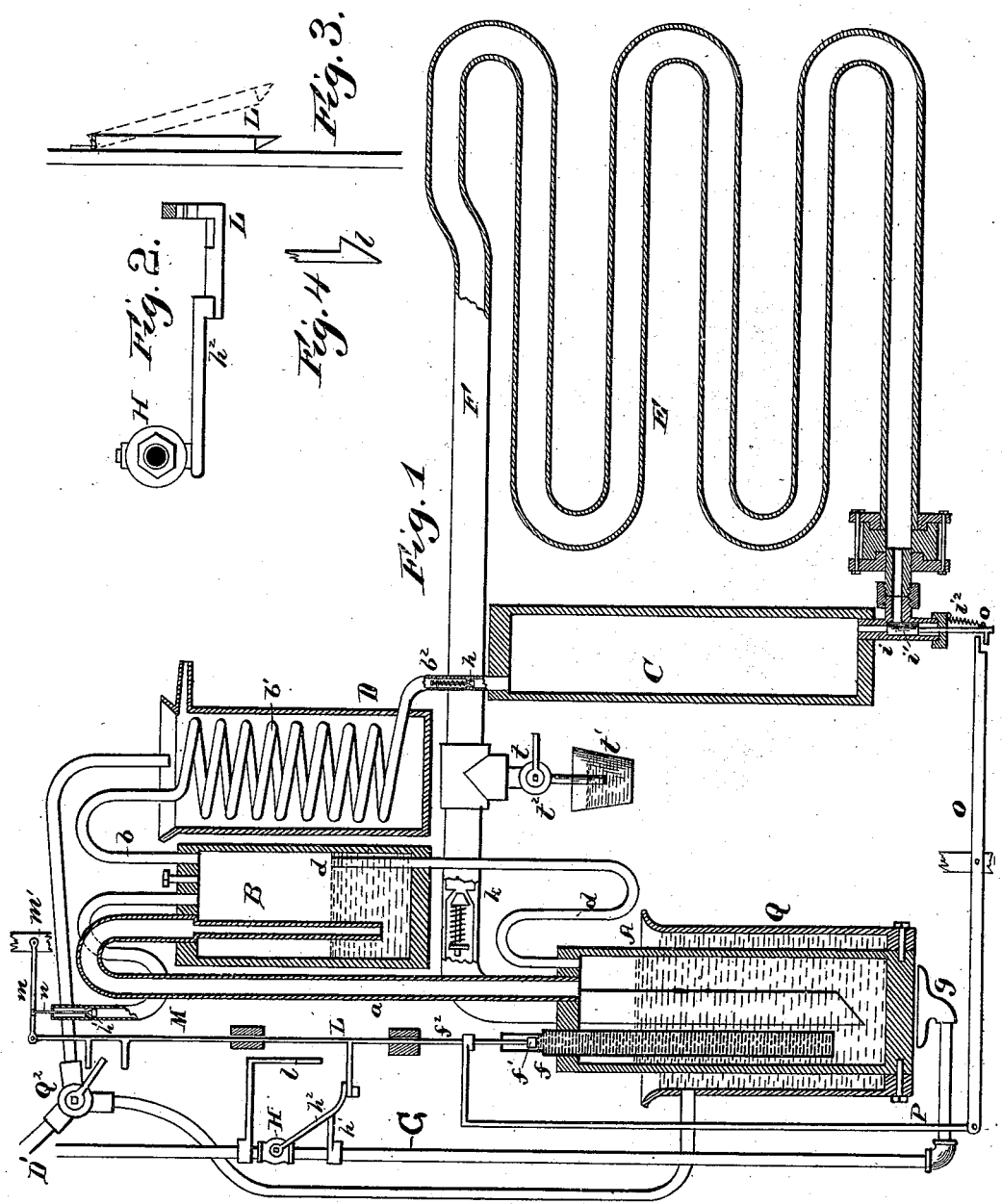

UNITED STATES PATENT OFFICE.

JACOB ERNY, ZACH T. SUBERS, AND WILLIAM HOOS, OF PHILADELPHIA, PENNSYLVANIA, ASSIGNORS TO THE INTERNATIONAL FREEZING AND REFRIGERATING MACHINE COMPANY OF NEW JERSEY, OF SAME PLACE.

FREEZING APPARATUS.

SPECIFICATION forming part of Letters Patent No. 446,252, dated February 10, 1891.

Original application filed January 3, 1890, Serial No. 335,796. Divided and this application filed April 28, 1890. Serial No. 349,712. (No model.)

*To all whom it may concern:*

Be it known that we, JACOB ERNY, ZACH T. SUBERS, and WILLIAM HOOS, citizens of the United States, residing at Philadelphia, in the county of Philadelphia and State of Pennsylvania, have invented certain new and useful Improvements in Freezing Apparatus, (the present application being a division of an application filed January 3, 1890, No. 335,796;) and we do hereby declare the following to be a full, clear, and exact description of the invention, reference being had to the accompanying drawings, which form part of this specification.

This invention has relation to refrigerating and freezing apparatus, and has for its object the provision of novel means whereby in a freezing or refrigerating machine in which the refrigeration is produced by the expansion of a suitable gas, the said gas, which may be ammoniacal gas, is liberated by heat from its aqueous solution, condensed by cold, liquefied by pressure, expanded so as to produce the requisite lowering of temperature for the refrigerating or freezing operation, and finally returned to and absorbed so as to again form an aqueous solution with the water with which it was originally associated, the said operations being performed automatically and the two phases of the process—that is, first, the liberation of the gas and its condensation and compression, and, second, the expansion of the compressed gas and its reabsorption in solution—being performed alternately.

In the accompanying drawings, which illustrate an apparatus embodying our invention, Figure 1 is a vertical longitudinal sectional view of the complete apparatus. Figs. 2, 3, and 4 are detail views of separate parts of the same.

A and B designate two cylinders or vessels made of extra heavy material, such as iron, and adapted to contain aqua-ammonia or other suitable solution. These two vessels are arranged in such relation that the bottom of the vessel B shall be elevated above the top of vessel A.

From the top of the cylinder A a pipe $a$ leads upward and over the cylinder B and extends downward into the latter nearly to its bottom—say about nine-tenths of its length. A backflow-pipe $d$ leads from the cylinder B to the top of cylinder A. This pipe is bent so as to form a trap, and its upper leg passes through the bottom of the cylinder B and rises within said cylinder about one-fourth the length of the latter. From the top of the cylinder B a pipe $b$ leads outward and is formed into a coil or worm $b\ b'$, which is contained within a cooling-vessel D, through which water is caused to flow from a suitable supply source. The pipe constituting the coil or worm is continued so as to lead into the top of a cylinder C, made of metal and of sufficient strength to withstand the pressure of its expansible contents. Between the coil $b'$ and the cylinder C the pipe $b^2$, leading from the former, is furnished with a suitable check-valve $h$, which prevents a backflow of gas from the cylinder C to the coil.

E designates a suitable freezing-coil, which communicates with the cylinder C at the bottom of the latter through an elbow-pipe $i$, in which is fitted a valve $i'$, constructed, arranged, and adapted to operate automatically, so as to open and close the communication of the cylinder with the freezing-coils alternately and according to the course and requirements of the process. From the extremity of the freezing-coil a pipe or extension F leads back to the cylinder A, and is continued down through the top of the latter to nearly the bottom, and at any suitable point along said pipe F is located a check-valve $k$, which prevents the gas rising from the contents of vessel A from passing along the pipe F to the cylinder C.

With the apparatus as so far described and with the cylinder A partially filled with aqua-ammonia and the cylinder charged with the same solution to about the level of the pipe $d$, the operation will be as follows: The cylinder A being heated by means of a gas-flame or other heating medium, the gas is liberated from the ammoniacal solution and passes through the pipe $a$ into cylinder B, while any moisture carried over with the gas is condensed and carried back through the pipe $a$ into the vessel A. The gas then passes from the cylinder B into and through the coil or worm, wherein it is condensed, and from which it flows into the cylinder C and is liquefied, and as a consequence of the pressure becomes heated or raised in temperature. When all or nearly all the ammoniacal gas has been distilled off from the cylinder A, the heat is turned off and the cylinder A allowed to cool off, the cooling being hastened and assisted by a circulation of water around the outside of the cylinder. The valve leading to the freezing-coil is now opened slightly, and the contents of the cylinder C gradually and slowly admitted to the freezing-coil, wherein the liquefied ammonia expands and instantly reduces the temperature of the freezing-coil to a very low degree. From the freezing-coil the gas returns by way of the pipe F to the cylinder A, wherein it is again taken up or reabsorbed by the water, thus restoring the solution to its normal condition, from which it may be again evaporated by the reapplication of heat. In order, however, to render the operations entirely automatic, we have contrived the following expedients: First, means for turning on and off the heating-flame or other heating medium; second, mechanism for periodically opening and closing the outlet-valve of the cylinder C; third, an exhaust-valve and gage by means of which, when it is desired to operate the apparatus, the air may be exhausted from the apparatus and the completion of the exhaust accurately determined.

Supposing that it is desired to employ a gas-flame to heat the cylinder A, a gas-supply pipe G is led down beside the cylinder A from a point some distance above the top of the latter and provided with a suitable burner $g$, located below the cylinder. At H is located a gas-cock provided with an elongated arm or handle $h$, weighted so as to fall by gravity until it rests against a stop $h'$. When the arm is in this position, the gas supply to the burner is cut off.

A pipe $f$ extends through the top of the cylinder A and downward about three-fourths the length of said cylinder. A piston $f'$ is arranged to move in this pipe, which is filled with an oil highly expansive under the influence of heat. The piston-rod $f^2$ extends upwardly parallel with the gas-pipe G, and upon the side of said piston-rod is hinged an L-shaped arm, the horizontal extension of which is normally below the outer extremity of the gas-cock lever, which extremity is beveled, as shown, so that on the descent of the piston-rod, the L-shaped arm, coming in contact with said gas-cock lever, will be swung aside and allowed to pass the latter. When the piston-rod rises, however, the L-shaped arm will contact with and raise the gas-cock, thus turning on the gas. A bevel-piece $l$ is arranged in the path of the extension of the L-shaped arm, and as the piston rises under the expansion of the oil to its full limit the L-shaped arm comes into contact with the beveled piece $l$ and is pushed aside, thus allowing the gas-cock lever to drop and shut off the gas. The upper end of the piston-rod is attached to a horizontal lever $m$, which is fulcrumed at $m'$, and between its ends is connected to a piston-rod $n$, which enters the upturned end of a trap-shaped pipe M, the other end of which enters the head of the cylinder B. This piston-rod is provided with a piston $n'$, which plays in a suitable piston-chamber formed in the end of the pipe M. This pipe, with its piston and connections, constitutes what we term the "starter," the functions of which are as follows: After the apparatus has been in operation and all the gas has been absorbed by the water in the two cylinders A and B the pressure will rise in these cylinders and the gas passing through the bent pipe M will raise the piston $n'$, and cause the same to lift the lever $m$, and with it the piston-rod $f^2$, thus turning on the gas, which, it may be stated, need not be entirely shut off, but only reduced to a very small flame, when the gas-cock lever is allowed to drop. It is obvious that a small supplementary gas-jet may be kept constantly lighted so as to ignite the main gas-burner when required.

In order to render the operation of the outlet-valve of the cylinder C automatic and to cause it to close when all the contents of the cylinder C are exhausted, this valve may be made in the form of a slide-valve and have its stem extended downwardly and provided with a stud $o$, which, when the cylinder is fully charged and the piston-rod $f^2$ raised to its fullest extent, will be struck by the end of the lever O, connected by means of a rod or rods P to said piston-rod. A suitable spring $i^2$ serves to restore the valve $i'$ to its closed position when the cylinder C is exhausted.

The condensing-coil has been described as being located within a vessel through which cold water flows. A similar vessel, as indicated at Q, may surround the cylinder A, forming a cooling-vessel therefor, and communicating by a pipe $Q'$ with the vessel D or with the water-supply pipe $D'$, as shown in the drawings, said water-supply pipe being provided with a three-way cock $Q^2$, the stem of which is coupled to the piston-rod $f^2$ by rods $f^3 f^4$, so that the movement of said rod will serve to turn the cock and alternately direct the cold water into the vessels D and Q.

At any suitable point on the return-pipe F an exhaust-pipe $p$ is coupled, and below the same is placed a small vessel containing water and lettered $t'$. The exhaust-pipe dips into this water and is provided with a cock or valve $t^2$. When the apparatus is first started after having been charged, the exhaust-pipe $t$ is opened, and from this pipe the air contained in the apparatus is driven off by the expanding gas, and its escape is indicated by the bubbling of the water in the vessel $t'$. As soon as the gas begins to issue the bubbling ceases, the gas being absorbed by the water, and the exhaust-pipe is closed by turning the cock $t^2$. It is only necessary to use this exhaust appliance when the apparatus is first charged, or at most at very long intervals.

Having described my invention, I claim—

1. In a refrigerating apparatus, the combination of the following features, to wit: a vessel to contain aqua-ammonia provided with a heater and a water-circulating cooler, with means for bringing the heater and cooler alternately into action, a drying-vessel located above and in communication with the first-named vessel, with a return-pipe leading to said vessel, a condensing-coil in communication with the gas-drying vessel and provided with a water-circulating cooler, a receptacle for liquefied gas in communication with the condensing-coil, a freezing-coil, and a return-pipe leading therefrom to the evaporating-vessel, substantially as and for the purpose described.

2. In a refrigerating apparatus, the combination, with a heating and evaporating vessel, the condensing-vessel, freezing-coil, a branch pipe leading from the condensing-vessel to the freezing-coil and provided with a valve, and the other vessels and pipes of a complete freezing system, of an automatic heat-regulator and suitable devices operatively connected to said regulator and comprising a system of levers coupling or connecting said heat-regulator to said valve for automatically closing and opening the communication between the condenser and freezing-coil accordingly as the heat is raised and lowered, substantially as described.

In testimony that we claim the foregoing we have hereunto set our hands this 7th day of April, 1890.

JACOB ERNY.
ZACH T. SUBERS.
WILLIAM HOOS.

Witnesses:
H. E. GARSED,
CHAS. DUBRAE.